Sept. 26, 1939.　　　　L. C. DOANE　　　　2,173,899
LIGHTING EQUIPMENT FOR PASSENGER VEHICLES
Filed March 25, 1936　　　4 Sheets-Sheet 1
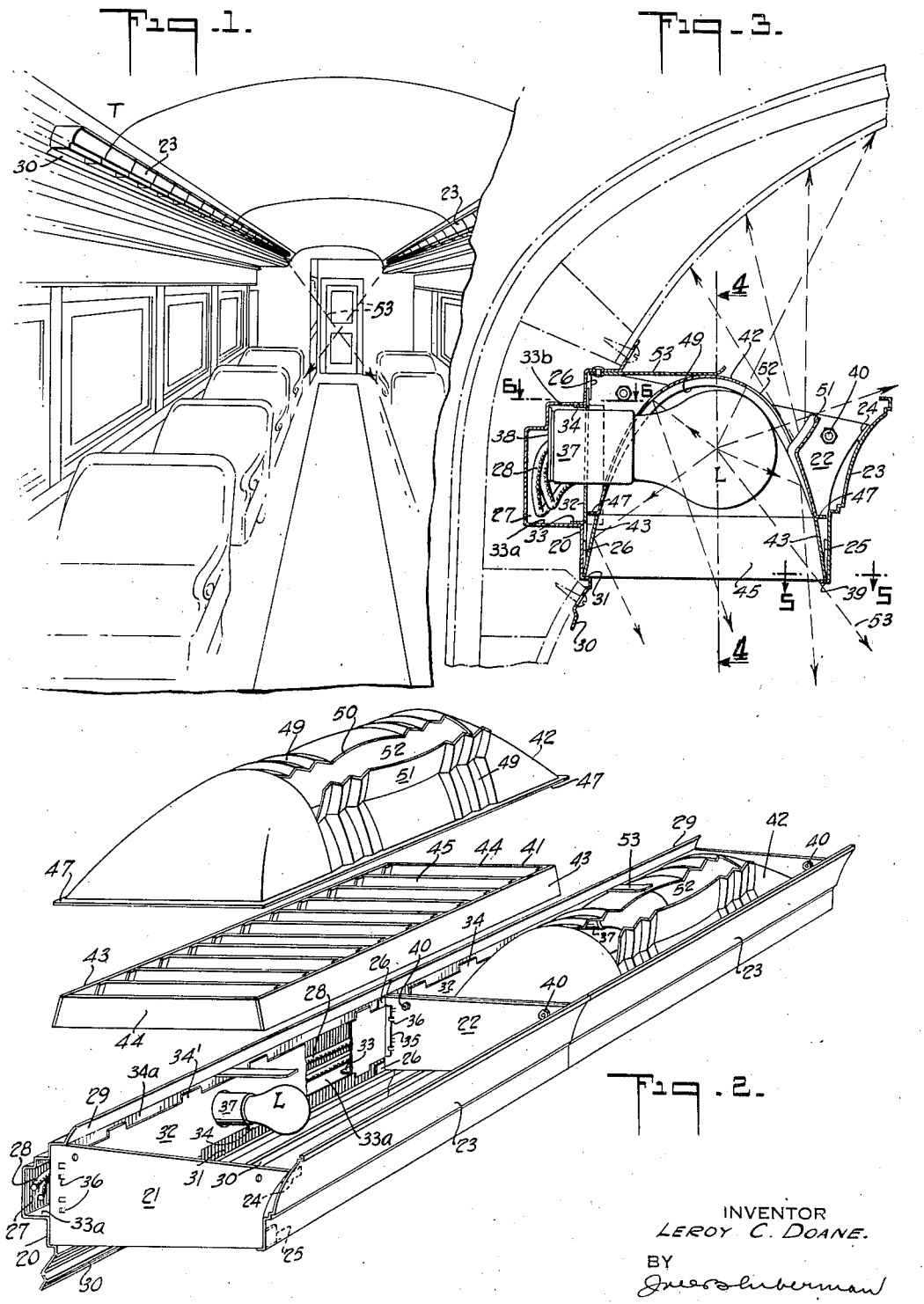
INVENTOR
LEROY C. DOANE.
BY
ATTORNEY

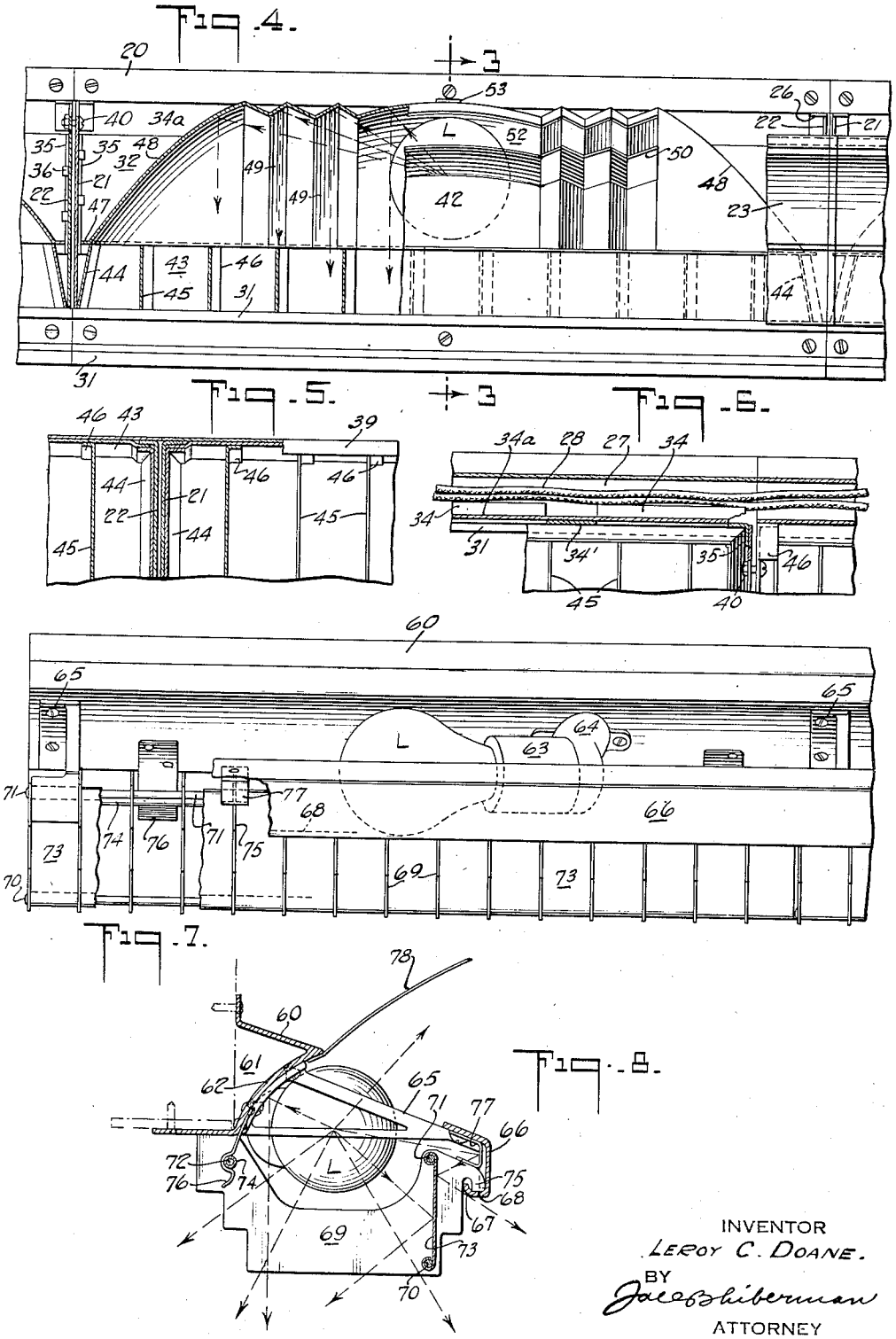

Sept. 26, 1939.   L. C. DOANE   2,173,899
LIGHTING EQUIPMENT FOR PASSENGER VEHICLES
Filed March 25, 1936   4 Sheets-Sheet 3
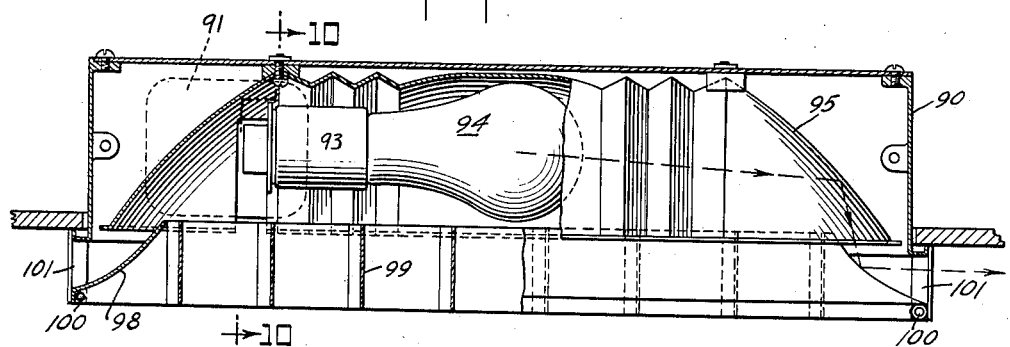
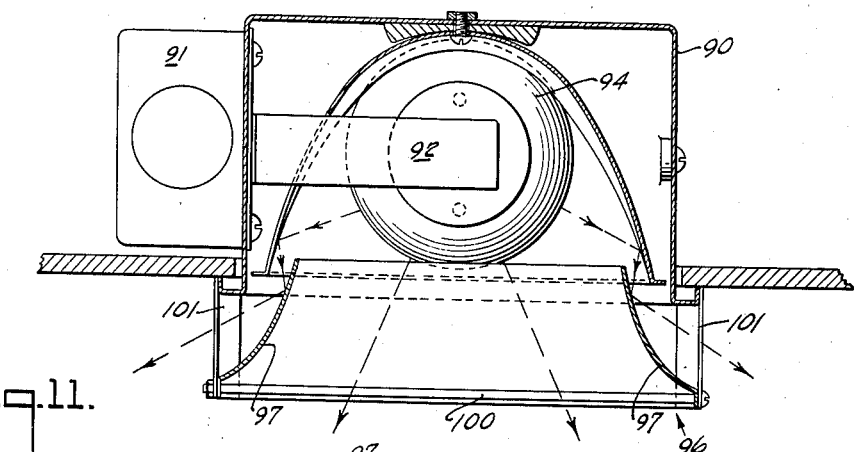
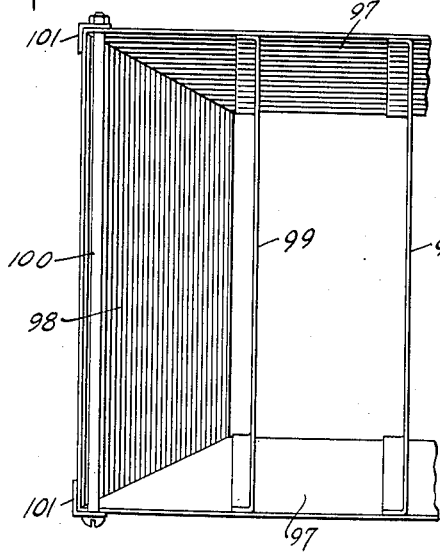
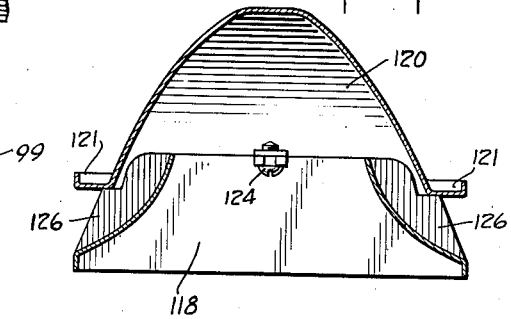
INVENTOR
LEROY C. DOANE.
BY
ATTORNEY

INVENTOR
LEROY C. DOANE.
BY
ATTORNEY

Patented Sept. 26, 1939

2,173,899

UNITED STATES PATENT OFFICE 2,173,899

LIGHTING EQUIPMENT FOR PASSENGER VEHICLES

Leroy C. Doane, Meriden, Conn., assignor to The Miller Company, Meriden, Conn., a corporation of Connecticut Application March 25, 1936, Serial No. 70,817

8 Claims. (Cl. 240—7.35)

The present invention relates to lighting equipment for passenger vehicles, and is more particularly directed toward lighting equipment adapted for use over the rows of seats provided along the sides of passenger cars and buses.

According to certain features of the invention, lighting equipment is contemplated wherein a plurality of regularly spaced light sources are supported above each row of seats and are associated with a long screen composed of a row of transversely disposed, regularly spaced louvers which screen the sources against observation by occupants of the seats underneath at ordinary angles of observation, and which allow the light to pass downwardly toward the seats to illuminate the reading plane.

The equipment is so placed in the car or vehicle that the downwardly emitted light spreads sufficiently in transverse planes to light up the upper side walls of the car, together with the baggage rack or advertising cards and the entire width of the seats, as well as the aisle. It may also be arranged so that a certain portion of the light escapes upwardly for indirect lighting from the car roof.

According to other features of the invention, each light source is associated with a reflector which intercepts all or part of the upwardly directed light and directs it downwardly through the screen into a beam of rays substantially parallel in longitudinal planes and of controlled spread in transverse planes whereby the light intensity directly below the light source is increased. The reflector may be employed with isolated light sources as well as in installations of the continuous type.

A further object of the present invention is to provide a passenger vehicle of the usual type having a central aisle and two rows of seats, with lighting equipment over a row of seats, and wherein the light sources along the side of the car are screened against observation by the occupants of the row of seats underneath by a series of transversely disposed baffles and louvers, and against observation by occupants of the opposite row of seats by a longitudinally extending baffle or screen on the aisle side.

Inasmuch as it is necessary to confine the structures to as shallow a vertical depth as possible, the present invention, in its preferred form, contemplates providing the reflectors with transverse corrugated surfaces arranged to reduce the spread of the light rays reflected in longitudinal planes whereby the light output may be more effectively concentrated into the region below the unit.

Other and further objects will appear as the description proceeds.

The accompanying drawings show, for purposes of illustrating the present invention, several embodiments in which the invention may take form, it being understood that the drawings are illustrative of the invention rather than limiting the same.

In these drawings:

Fig. 1 is a perspective view of the interior of a passenger coach provided with a continuous lighting trough;

Fig. 2 is a perspective view of the lighting trough of Fig. 1, parts being broken away and separated to illustrate the interior construction;

Fig. 3 is a vertical sectional view taken on the line 3—3 of Fig. 4 and showing the construction of Figs. 1 and 2;

Fig. 4 is a longitudinal sectional view taken on the line 4—4 of Fig. 3;

Fig. 5 is a fragmentary sectional view taken on the line 5—5 of Fig. 3;

Fig. 6 is a fragmentary sectional view taken on the line 6—6 of Fig. 3, the reflector being omitted;

Fig. 7 is a side elevational view of a modified form of continuous lighting trough, parts being in section;

Fig. 8 is a transverse sectional view thereof;

Fig. 9 is a longitudinal sectional view through an isolated unit designed for railway car lighting;

Fig. 10 is a vertical sectional view on the line 10—10 of Fig. 9;

Fig. 11 is an inverted plan view of the louver system of Fig. 10, parts being broken away;

Fig. 15 is a section on the line 15—15 of Fig. 14.

Figure 12:
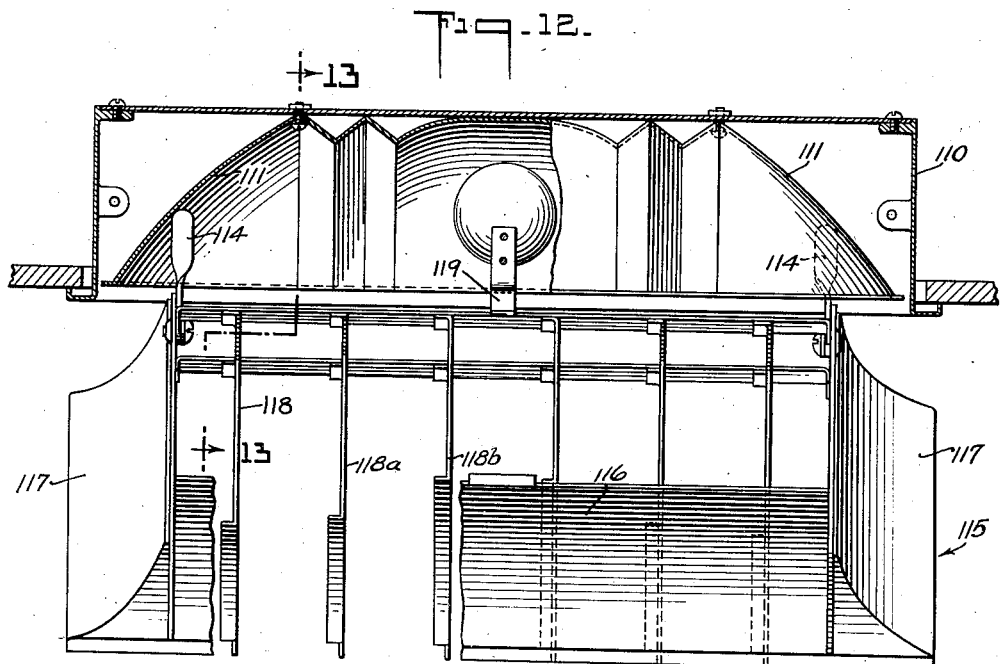
Fig. 12 is a longitudinal sectional view on the line 12—12 of Fig. 13 illustrating a form of unit designed for base lighting and having a downwardly hinged louver system.

From Fig. 1 it will be apparent that the continuous lighting trough T is placed above the row of seats and near the arched ceiling of the car. While this lighting trough appears to be structurally continuous, it is made up of a plurality of units which may be assembled to form the continuous illuminating structure. Each of these units is complete and the description of one unit will suffice for all.

Each unit has a rear conduit-forming channel member 20 adapted to be received in the upper side wall of the car, two forwardly extending end members 21 and 22 which may be identical, and a front ornamental molding member 23. The front member is secured to the end members 21 and 22 by being spot-welded to ears 24 and 25 bent from the material of the end walls. The end walls 21 and 22 are also provided with laterally bent lugs or ears 26 which may be spot-welded to the rear conduit-forming channel member 20.

The rear conduit-forming channel 20 is recessed, as indicated at 27, to accommodate wires indicated at 28, and is provided with an upwardly extending mounting flange 29 and a downwardly extending mounting flange 30, this latter flange having a forwardly extending horizontal shoulder indicated at 31. The wiring channel 27 is covered by a plate or channel cover 32. This plate is made of sheet metal and has inwardly extending flanges 33 and 34 adapted to frictionally fit the top and bottom walls 33a and 33b of the wire-forming channel. The plate also has upwardly and downwardly extending lugs 34' which engage the face 34a of the conduit-forming strip 27 to limit the inward movement of the cover. The ends of the cover are bent forwardly as indicated at 35 and fit in behind spring ears 36 formed in the plates 21 and 22. A lamp socket 37 is secured to a socket-supporting member 38 carried by the channel member 27. This socket projects forwardly to support a lamp bulb L, whose center is, as indicated in the drawings, at the center of the unit. The front cover member 23 has an inwardly projecting shelf or flange 39 opposite the flange or shelf 31, as will be apparent from Fig. 3.

A plurality of boxes such as described in detail may be mounted in place lengthwise of the car, as indicated in the drawings, and they will form a continuous wiring channel so as to facilitate wiring in all the units. The boxes may be secured together by bolts indicated at 40.

Each box is adapted to receive a louver assembly unit indicated at 41, and a trough-shaped reflector indicated at 42, both made preferably of aluminum so as to diffusely reflect light. The louver assembly unit has longitudinally extending side members 43 preferably disposed to form continuations of the contour of the reflector, as shown in Fig. 3. These side members 43 are connected to cross-members 44, 45, as shown in the drawings. The end members 44 are tilted to meet the reflector, as indicated, and the intermediate members 45 are in vertical planes. These cross-members are provided with end flanges 46 and welded to the longitudinally extending side members 43. Each louver unit 41 is designed to be just the proper size to fit into the box and to be supported in place by the inwardly extending flanges 31 and 39.

The reflector 42 has a bottom flange 47 adapted to rest on the top of the louver assembly and to fit out against the side walls of the box so as to properly align the parts. The reflector 42 is comparatively deep in transverse planes, as indicated in the drawings, so as to produce a reflected beam of moderate spread in transverse planes, the direct light spreading more widely. The longitudinal cross-section of the reflector appears more clearly in Fig. 4. Its effective shape is substantially parabolic. The center of the reflector, as well as the sloping end portions 48 and transverse corrugations 49, are designed to intercept zones of light and reflect the dominant rays vertically downward so as to pass through the louver assembly without interference. As the bulb is preferably frosted, and the surfaces of the reflector light diffusing, there is considerable scattering of reflected light. This scattering light is further scattered by the plates of the louver assembly.

The upper front part of the reflector 42 is slitted, as indicated at 50, and a portion of the material is bent forwardly, as indicated at 51, to provide a supplemental reflector which intercepts light passing through the opening 52 and reflects that light upwardly toward the ceiling of the car, as indicated in Fig. 3. Some direct light also passes from the bulb through the opening and illuminates the upper and opposite part of the car ceiling. Where the light control afforded by the reflector is not desired, it may be omitted.

It will be noted that the unit shown in Figs. 1-6 is well adapted for providing a continuous lighting trough for direct lighting, as well as indirect lighting, in the car. The screen plates effectively conceal the light source against observation by the occupants of the row of seats below, and the cut-off line 53 of direct light on the aisle side is so low as to prevent annoyance of passengers in the opposite row of seats.

To hold the parts securely in place and prevent rattling, a swingable spring clip 53 is provided. It is attached to the conduit-forming stamping and can be swung out over on top of the reflector so as to press the reflector and louver assembly down against the supporting flange.

In the construction shown in Figs. 7 and 8, the side wall of the car is provided with a longitudinally extending wireway-forming member 60 preferably made of extruded aluminum which may be secured in place by screws, as indicated. This strip affords a wireway indicated at 61, and is provided with a downwardly concave light-reflecting surface 62. Lamp sockets 63 are mounted on brackets 64 secured to the strip 60 and carry lamp bulbs L, as indicated. The strip 60 also carries forwardly-extending brackets 65. The front ends of these brackets are secured to a longitudinally extending front strip 66 also preferably made of extruded aluminum. The bottom of this strip is bent upwardly, as indicated at 67, so as to provide a pocket 68.

The lower louver assembly employs a plurality of transversely arranged plates 69 held together by longitudinally extending rods 70, 71, 72, the louver plates being spaced apart by baffle plates 73 on the aisle side and sleeves 74 on the opposite side.

In the form of construction shown, these plates have hook-like members 75 which enter the groove 68 so that the aisle side of the louver assembly is supported in position. The opposite side of the louver assembly is supported by spring clips 76 carried by the strip 60 and adapted to engage with the sleeves 74. To prevent rattling, small spring clips 77 are placed between the outer strip 66 and certain of the louvers whereby the parts are pressed downwardly and held in place.

If desired, one can provide an additional or optional reflector above the unit, as indicated at 78.

Fig. 8 shows the paths of the light rays in transverse planes through the light source.

It will be noted that the spacer strips 73 on the aisle side of the unit cut off high angled light in transverse planes so that no direct light escapes to annoy the passengers seated in the opposite row of seats, and so that the outer surface of this baffle or screen is illuminated by light reflected by the inside of the strip 66. When equipment on both sides of the car is in operation, the scattered light will satisfactorily illuminate the outer surface of the strip 66 so that no dark or unilluminated areas will appear.

The amount of upwardly emitted light may be controlled by varying the amount of reflecting surface above the light sources.

The form of construction shown in Figs. 7 and 8 has the same general advantages as that shown in Figs. 1 and 2 except for the provisions for the direct and indirect lighting of the car ceiling. The downward illumination is controlled in very much the same way as in the construction of Fig. 1, except for the more accurate control resulting from the refinements in the construction of the upper reflector 42.

The structure shown in Figs. 9-11 inclusive is designed to provide isolated units which incorporate certain of the advantages of the forms of construction shown in Figs. 1 to 8 designed for continuous lighting. In Fig. 9, the box indicated at 90 is designed to be recessed into the ceiling of the vehicle. It carries an outlet box 91 provided with a strap or arm 92 adapted to support a lamp socket 93 with its axis longitudinal and adapted to carry a lamp bulb 94. The reflector 95 may be the same as the reflector 42 previously described except that it is not perforated to provide for escape of light upwardly, and further, it is designed for use with a lamp bulb supported in a different position, as will be obvious from the drawings.

The louver assembly 96 is provided with longitudinally extending curved light deflectors indicated at 97 and curved end deflectors indicated at 98. It also has a plurality of transversely extending vertical plates 99. These plates allow the light rays to pass downwardly without change of direction in transverse planes but intercept the direct and scattered reflected light and change its direction in longitudinal planes in the same way as above described. In addition, the side and end deflectors 97 and 98 intercept some of the light and scatter it out for illumination in high angles. The employment of side deflectors on louver systems is claimed in my application Serial No. 70,816 filed concurrently herewith.

The louver assembly is supported in any convenient manner, as for example, by bolts 100 extending through posts 101 fixedly secured to the box 90.

Figure 13:
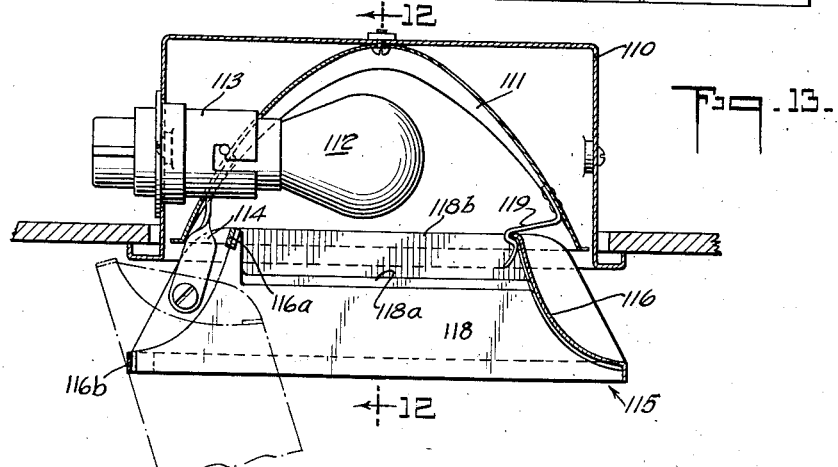
Fig. 13 is a transverse sectional view on the line 13—13 of Fig. 12.

In the bus lighting units illustrated in Figs. 12 and 13 inclusive, the box for receiving the reflector is indicated at 110. It is recessed into the ceiling and held in place in any desired manner. It supports a reflector 111 similar to the reflector 42 but made smaller. The lamp bulb 112 is carried in the lamp socket 113 here shown as mounted in a horizontal axis and slightly offset to shift the reflected beam laterally. Where a symmetric beam is desired, the light source is placed central. In some cases the bulb may be mounted on a vertical axis. The reflector 111 is provided with two downwardly extending hinge members 114 which hingedly support the louver assembly indicated at 115. This louver assembly has a continuous side deflector on one side as indicated at 116 and parallel straps 116a and 116b along the other side. Two continuous deflectors may be used. The end deflectors are indicated at 117. It also has cross-plates 118, 118a, 118b of different depths, the deeper plates being closer to the lamp bulb. The louver assembly can be swung down, as indicated in full lines in Fig. 12 and dotted lines in Fig. 13, or may be held upwardly in the full line position of Fig. 13 by a catch indicated at 119.

Figure 14:
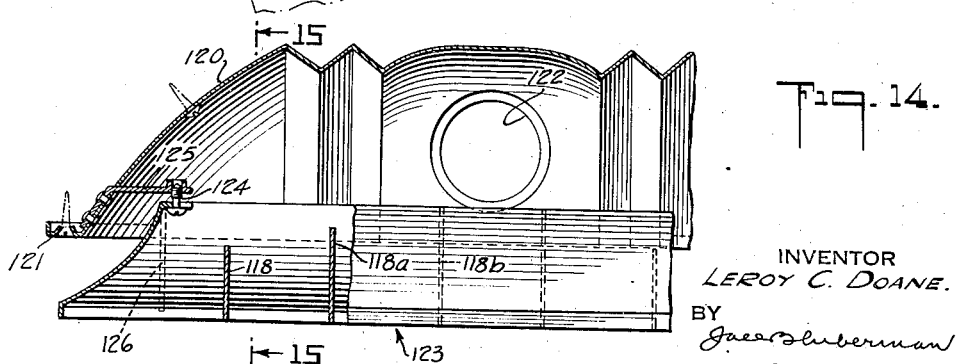
Fig. 14 is a view similar to Fig. 12 illustrating a modified form of bust lighting unit.

The arrangement shown in Figs. 14 and 15 contemplates the employment of a reflector 120 of similar contour to the reflector shown in Fig. 12, except that it is provided with flanges 121 whereby it can be mounted directly to the ceiling of the vehicle. As this device is intended for use without an outlet box, the reflector is provided with a suitably placed aperture 122 to receive and support the lamp socket. The louver assembly 123 may be a die casting of the same effective contour as that shown in Figs. 12 and 13. It is herein shown as being supported by screws 124 which enter into mounting straps or clips 125 carried by the reflector. It has shouldered stops 126 to engage the flange 121 on the reflector.

It is obvious that the invention may be embodied in many forms and constructions within the scope of the claims, and I wish it to be understood that the particular forms shown are but a few of the many forms. Various modifications and changes being possible, I do not otherwise limit myself in any way with respect thereto.

What is claimed is:

1. A direct lighting unit for passenger vehicles comprising a light source, a longitudinally extending, inverted reflector of greater length than breadth for reflecting light downwardly at controlled spread in transverse planes, the ends of the reflector sloping downwardly and outwardly to intercept light and reflect it downwardly at lowered angles, and a screen below the reflector and light source, the screen being substantially coextensive with the mouth of the reflector comprising a plurality of vertically disposed, transversely extending, diffusing plates which screen the light source from direct observation at directions substantially angularly distant from the nadir, and condense the direct and reflected light in longitudinal planes without affecting its distribution in transverse planes, the reflector having a longitudinally extending slot to one side of the longitudinal axis of the reflector and which permits the escape of an upward component of light for indirect lighting.

2. A direct lighting unit for passenger vehicles comprising a light source, a longitudinally extending, inverted reflector of greater length than breadth for reflecting light downwardly at controlled spread in transverse planes, the ends of the reflector sloping downwardly and outwardly to intercept light and reflect it downwardly at lowered angles, and a screen below the reflector and light source, the screen being substantially coextensive with the mouth of the reflector comprising a plurality of vertically disposed, transversely extending, diffusing plates which screen the light source from direct observation at directions substantially angularly distant from the nadir, and condense the direct and reflected light in longitudinal planes without affecting its distribution in transverse planes, the reflector having a longitudinally extending slot to one side of the longitudinal axis of the reflector and which permits the escape of an upward component of light for indirect lighting and supporting a longitudinally extending supplemental reflector which intercepts some of said upward component and scatters it.

3. A lighting unit comprising a fixed support of generally rectangular configuration open at the top and bottom, a light source mounted in substantially the center of the support, a rectangular screen removably carried in the support below the light source and comprising a plurality of transverse vertically disposed plates, and a generally rectangular reflector resting on top of the screen and enclosing the light source.

4. A lighting unit as claimed in claim 3, wherein the back of the support comprises a wiring channel and a cover for the channel.

5. A lighting unit as claimed in claim 3, wherein the reflector has a longitudinally extending slot above and to one side of the source for indirect lighting.

6. A lighting unit as claimed in claim 3, wherein the reflector has a longitudinally extending slot above and to one side of the source and an upwardly extending light interceptor adjacent the outer edge of the slot for reflecting light rearwardly above the reflector.

7. A lighting unit comprising a fixed support of generally rectangular configuration and open at the bottom, a light source mounted substantially in the center of the rectangular support, a rectangular screen removably carried in the support below the light source and comprising a plurality of transverse vertically disposed plates, the upper edges of the plates being slightly below the bulb enclosing the light source, and a generally rectangular reflector received in the support and enclosing the light source, the reflector mouth being substantially coextensive with the top of the screen and the top of the reflector being close to the top of the bulb, the reflector having a central longitudinal portion of substantially parabolic contour above the source, transverse corrugations or steps adjacent the central portion whose light incident sides are of similar contour, and end portions therebeyond of similar contour, all portions reflecting light toward the nadir.

8. A lighting unit comprising a fixed support of generally rectangular configuration and open at the bottom, a light source mounted substantially in the center of the rectangular support, a rectangular screen removably carried in the support below the light source and comprising a plurality of transverse vertically disposed plates and longitudinally extending downwardly and outwardly divergent light reflecting side plates, the upper edges of the plates being slightly below the bulb enclosing the light source, and a generally rectangular reflector received in the support and enclosing the light source, the reflector mouth being substantially coextensive with the top of the screen, the lower edges of the longer sides of the reflector mouth being closely adjacent the upper edges of the divergent side plates, the side plates screening the light source below the reflector mouth and confining the lateral spread of light to substantially smaller angles than the sides of the reflector.

LEROY C. DOANE.